E. H. AULT.
METHOD OF TREATING COTTON SEED FOR SEPARATING MEATS FROM HULLS.
APPLICATION FILED AUG. 15, 1916.
1,306,991.
Patented June 17, 1919.
2 SHEETS—SHEET 1.
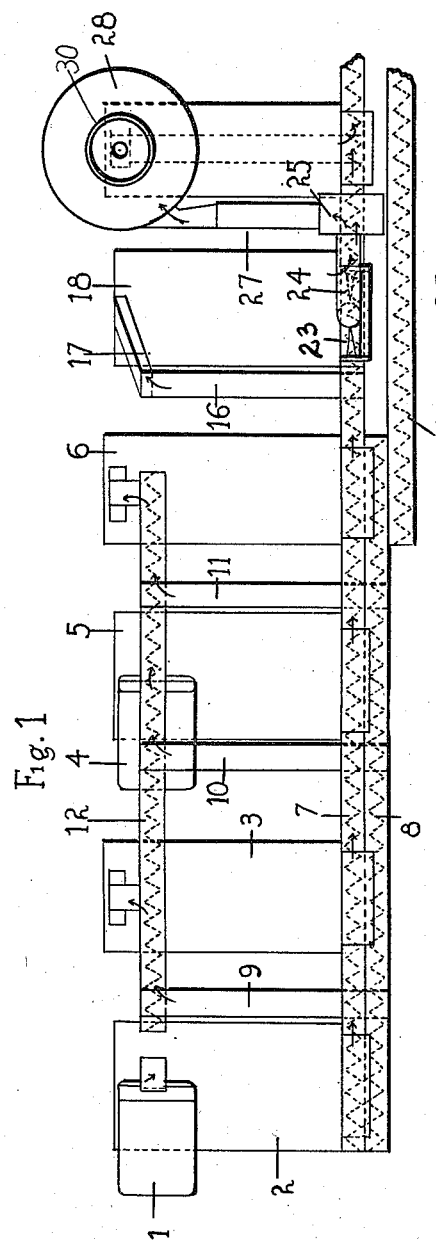
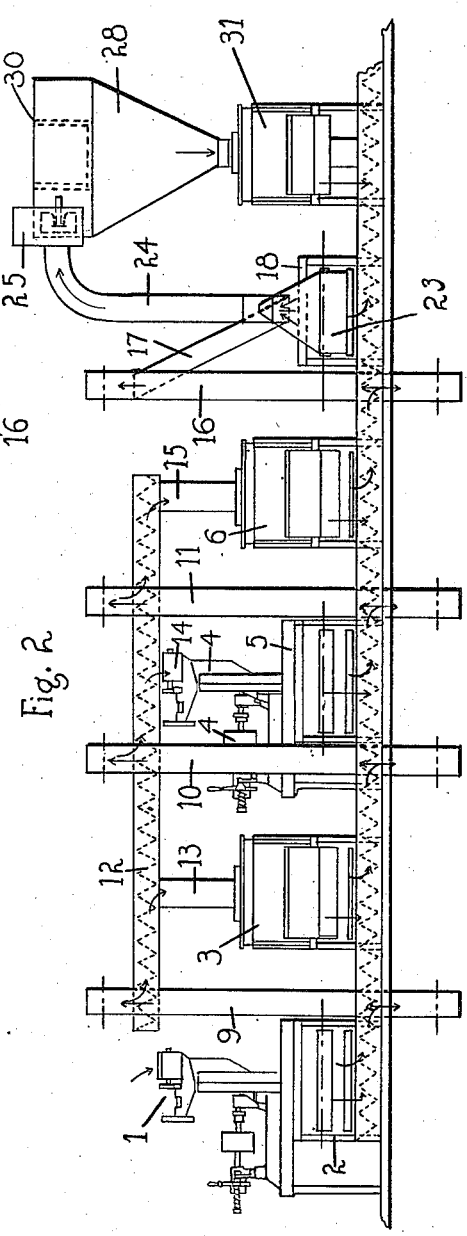
Inventor
Edward H. Ault
By Staley & Bowman
Attorneys

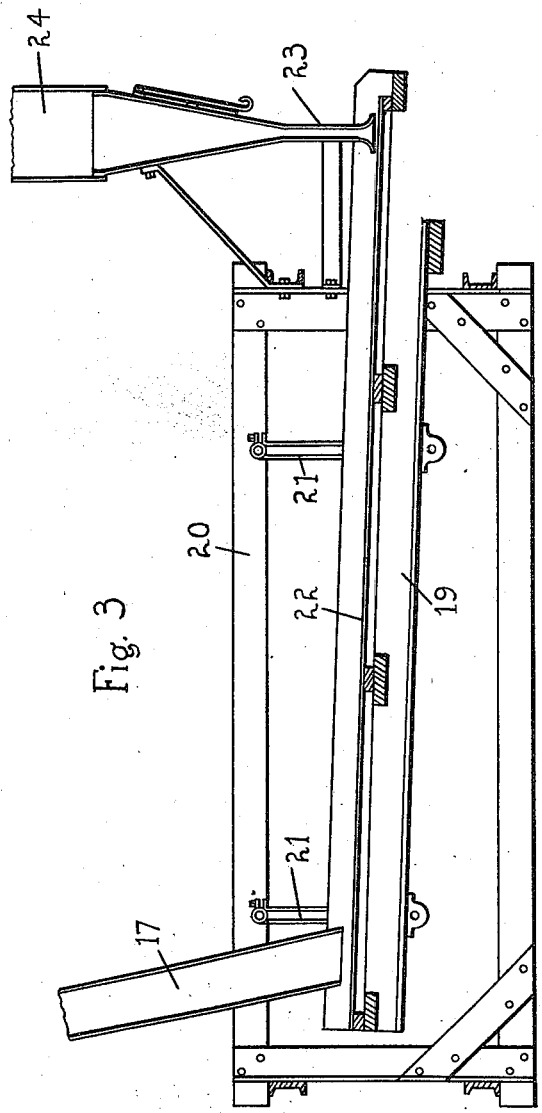
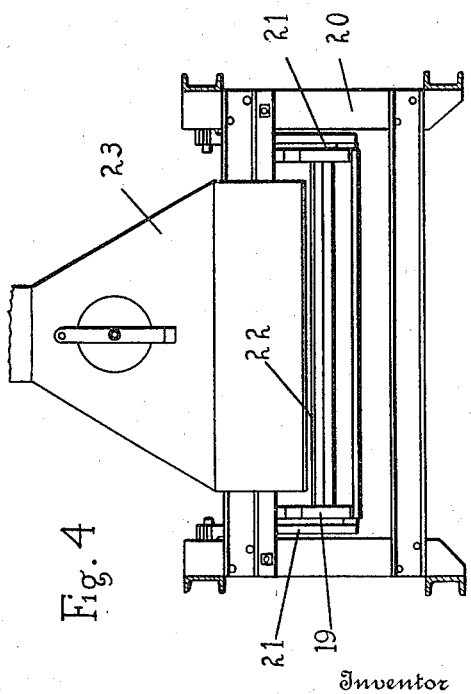

UNITED STATES PATENT OFFICE.

EDWARD H. AULT, OF SPRINGFIELD, OHIO, ASSIGNOR TO THE BAUER BROTHERS COMPANY, OF SPRINGFIELD, OHIO, A CORPORATION OF OHIO.

METHOD OF TREATING COTTON-SEED FOR SEPARATING MEATS FROM HULLS.

1,306,991.      Specification of Letters Patent.    Patented June 17, 1919.

Application filed August 15, 1916. Serial No. 114,983.

*To all whom it may concern:*

Be it known that I, EDWARD H. AULT, a citizen of the United States, residing at Springfield, in the county of Clark and State of Ohio, have invented certain new and useful Improvements in Methods of Treating Cotton-Seed for Separating Meats from Hulls, of which the following is a specification.

My invention relates to a method of treating cotton seeds for the purpose of separating the meats from the hulls.

The object of my invention is to provide a method which will separate the meats from the hulls in a more efficient way, the particular object of the invention being to provide for eliminating from the meats particles of hulls which have not been separated therefrom by the initial separating apparatus.

In the accompanying drawings:—

Figure 1 is a top plan view of the apparatus employed for carrying out my method.

Fig. 2 is a side elevation of the same.

Fig. 3 is a side elevation of a portion of the same.

Fig. 4 is an end view of the parts shown in Fig. 3.

It has recently become the practice in the process of linting cotton seeds to remove a larger percentage of the lint therefrom than heretofore. Heretofore where a considerable portion of the lint was left adhering to the seeds, this tended, during the process of beating and shaking the seeds for the purpose of separating the meats from the hulls, to cause the hulls to be retained by the meshes of the screens employed for the purpose, but where the cotton lint, however, is nearly all removed from the seeds, there is a tendency for a portion of the hulls to find their way through the screens with the meats during the separation process by the method heretofore employed. In order to overcome this difficulty and provide means for eliminating from the meats most of these particles of hulls, which generally have adhering thereto some particles of meat, I have devised a method employing an apparatus which I will now describe; the method also contemplating the separation of the particles of meat from the hulls after they have been eliminated from the already separated particles of meat.

So far as the apparatus for carrying out the initial performance of my method is concerned, it is the same as generally heretofore employed, consisting usually in successive order of a huller 1, shaking separator 2, beating separator 3, a second huller or grinder 4, a second shaking separator 5, and a second beating separator 6. As in the previous method, the conveyers 7 and 8 are employed into which the material from the various separators is discharged, the separated meats being discharged into the conveyer 7 and the hulls and still adhering particles of meats onto the conveyer 8. The conveyer 8 conducts the hulls and adhering particles of meat successively into the elevators 9, 10 and 11, said elevators carrying the hulls and adhering particles of meat to the conveyer 12 so as to cause them to be fed successively into the beating separator 3, second huller or grinder 4, shaking separator 5 and second beating separator 6 through the medium of the chutes 13, 14 and 15; the hulls being finally discharged onto the conveyer 16 from the beater 6 where they are conducted to any suitable point; provision being preferably made for causing the tailings from the shaker of the beating separator 6 to again travel through the beating separator 6.

During this separating process, due to the reasons before stated, particles of hulls, some with adhering meat, have found their way with the separated meats onto the conveyer 7 and in order to separate these particles of hulls and adhering meats from the completely separated meats I have devised a method employing the following apparatus:

The conveyer 7 conducts the material to an elevator 16 from the upper end of which leads a chute 17 to another shaking separator 18, shown in detail in Fig. 3. This separator is similar to the ones 2 and 5, a screen 22, carried by the shaker frame 19, being employed of a proper mesh to permit the smaller pieces of meats to drop onto the bottom of the shaker frame; the shaker frame being pivotally supported from the hangers 21 which are pivotally connected with the main frame 20 and suitable means, not shown, being employed for oscillating the same. The chute 17 previously referred to discharges the material upon the upper end of the screen 22 where it finds its way to the lower end, in the meanwhile being agitated by the oscillation of the shaker until by the time the larger particles of meats and also the hulls reach the lower end of the shaker it is spread over the same in a layer of uniform thickness. Over the lower end of the screen 22 is an elongated hood 23 the upper end of which communicates with a spout 24, the upper end of which leads to a fan 25. From the fan leads a conduit 27 which communicates with the upper end of what is commonly called a cyclone 28, the upper portion of which is circular in form and the lower portion of which is converged so as to form inclined walls. The interior of the circular portion of the cyclone is provided with a centrally arranged open-ended thimble 30, the lower end of which is in communication with the interior of the cyclone and the upper end of which communicates with the atmosphere. As a result of this construction, the hulls are drawn upwardly through the spout 24 into the fan casing 25 by suction and then forced by an air blast from the conduit 27 into the upper portion of the cyclone and swirled about the thimble 30, the pressure of air relieving itself through the thimble and allowing the particles of hulls and adhering meats to drop down the inclined walls of the cyclone where they enter a beating separator 31 or are returned to beater 6 as desired and are put through a final beating operation which separates the adhering meats from the hulls; the meats being discharged onto the conveyer 7 and the hulls onto the conveyer 16.

I have not thought it necessary to describe in detail the grinders and separators as these various machines are well known, being illustrated for instance in Letters Patent No. 989,686, dated April 18th, 1911; Patent No. 1,067,297 dated July 15th, 1913 and Patent No. 1,183,110 dated May 16th, 1916.

Having thus described my invention, I claim:—

1. The method of treating cotton seed to separate the meats from the hulls, consisting of breaking and agitating the seeds to separate the meats from the hulls, subjecting the meats to a shaking action upon a flat screen to place the same in a substantially uniform layer thereon, subjecting the meats to a suction of air to eliminate particles of hulls therefrom and putting such particles of hulls through a final separator to separate any adhering meats from the hulls.

2. The method of treating cotton seed, consisting of breaking and agitating the seed to separate the meats and hulls, subjecting the meats to a shaker action on a flat screen to place the same in a substantially uniform layer, passing the meats on said screen beneath an air suction to separate the remaining particles of hulls therefrom, passing said hulls through an arrester, and putting the hulls through a final separator to separate any adhering meats from the hulls.

3. The method of treating cotton seed to separate the hulls from the meats by first breaking the seed, then screening the product and causing the tailings containing hulls with adhering meats to flow in one stream and meats and hulls with adhering meats that have passed through the meshes of the screen, in a separate stream, then screening the last named screenings upon a flat shaking screen giving it a uniform layer thereon and applying a suction thereto to lift the hulls with adhering meats therefrom and then subjecting the same to a beating separator to separate the adhering meats from the hulls.

In testimony whereof I have hereunto set my hand this 11th day of August, 1916.

EDWARD H. AULT.

Witness:
   CHAS. I. WELCH.